(12) United States Patent
Buschbeck et al.

(10) Patent No.: US 8,294,965 B2
(45) Date of Patent: Oct. 23, 2012

(54) HOLOGRAPHIC RECONSTRUCTION SYSTEM AND METHOD WITH A SEQUENCE OF VISIBILITY REGIONS

(75) Inventors: Steffen Buschbeck, Jena (DE); Armin Schwerdtner, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 412 days.

(21) Appl. No.: 12/601,018

(22) PCT Filed: May 14, 2008

(86) PCT No.: PCT/EP2008/055894
§ 371 (c)(1),
(2), (4) Date: Nov. 20, 2009

(87) PCT Pub. No.: WO2008/141988
PCT Pub. Date: Nov. 27, 2008

(65) Prior Publication Data
US 2010/0284049 A1    Nov. 11, 2010

(30) Foreign Application Priority Data
May 21, 2007  (DE) .......................... 10 2007 024 235

(51) Int. Cl.
*G02B 5/32*   (2006.01)
*G03H 1/08*   (2006.01)
*G03H 1/30*   (2006.01)
*G03H 1/02*   (2006.01)

(52) U.S. Cl. .................... 359/21; 359/9; 359/25; 359/27

(58) Field of Classification Search .................... 359/25, 359/32, 21, 27
See application file for complete search history.

(56) References Cited

U.S. PATENT DOCUMENTS

2006/0250671 A1 *  11/2006  Schwerdtner et al. ............ 359/9
2009/0257111 A1    10/2009  Heikenfeld et al.

FOREIGN PATENT DOCUMENTS

| DE | 10 2007 051 521 A1 | 4/2009 |
|---|---|---|
| JP | 09068674 | 3/1997 |
| WO | WO 2004/044659 | 5/2004 |
| WO | WO 2006/119760 | 11/2006 |
| WO | WO 2006/119920 | 11/2006 |
| WO | WO 2007/099457 | 9/2007 |
| WO | WO 2008/077789 | 7/2008 |
| WO | WO 2008/092852 | 8/2008 |

OTHER PUBLICATIONS

International Search Report, dated Sep. 29, 2008, issued in priority International Application No. PCT/EP2008/055894.
Fukaya et al., "Eye-position tracking type electro-holographic display using liquidcrytsal devices," Asia Display, pp. 963/964 (Jan. 1, 1995) XP002940561.

* cited by examiner

Primary Examiner — Jade R Chwasz
(74) Attorney, Agent, or Firm — Saul Ewing LLP (57) ABSTRACT

A holographic reconstruction system and method for the three-dimensional reconstruction of object light points of a scene. The system includes spatial light modulation means which modulate light waves capable of interference with at least one video hologram, focusing means which focus the modulated light waves so that a viewer can view the reconstructed object light points of the scene from a visibility region that is thereby produced by focusing, and deflection means which position the visibility region by aligning the modulated light waves. The holographic reconstruction system includes deflection control means for controlling the deflection means to sequentially adjust the visibility region to different contiguous viewing positions, and light controlling means for switching the light waves in synchronicity with the deflection control means.

19 Claims, 7 Drawing Sheets

HOLOGRAPHIC RECONSTRUCTION SYSTEM AND METHOD WITH A SEQUENCE OF VISIBILITY REGIONS

CROSS REFERENCE TO RELATED APPLICATIONS

This application claims the priority of PCT/EP2008/055894, filed on May 4, 2008, which claims priority to German Application No. 10 2007 024235.4, filed May 21, 2007, the entire contents of which are hereby incorporated in total by reference.

BACKGROUND OF THE INVENTION

The present invention relates to a holographic reconstruction system for the three-dimensional reconstruction of object light points of a scene, and to an according method. The holographic reconstruction system comprises spatial light modulator means which modulate light waves which are capable of generating interference with at least one video hologram, focussing means which focus the modulated light waves such that an observer can watch the reconstructed object light points of the scene from a visibility region which is thus generated by way of focussing, and deflection means which position the visibility region by way of directing the modulated light waves.

In a holographic reconstruction system, sufficiently coherent light is modulated by spatial light modulator means (SLM), e.g. an LCD. A diffractive structure, the hologram or a sequence of holograms, is encoded on the SLM. Object light points are generated through interference of the light which is modulated with holograms in the SLM. The entirety of those object light points form the three-dimensional reconstruction of an object or scene. The light of all object light points propagates in the form of a light wave front, so that one or multiple observers can watch those object light points from an eye position as a three-dimensional scene. For the observer, the light appears not to come from the SLM, but from the three-dimensional object reconstruction, i.e. from multiple depth planes. The observer focuses his eyes on the object reconstruction with its multiple depth planes. The eyes can only see the light which is diffracted by the SLM, but not the light which is transmitted directly. When watching a holographic display, an observer thus ideally has the same impression as if they watched a real object. This means that in contrast to a stereoscopic representation, a holographic reconstruction realises an object substitute, which is why the problems known in conjunction with stereoscopy, such as fatigue of the eyes and headache, do not occur, because there is generally no difference between watching a real scene and a holographically reconstructed scene.

Prior art holographic reconstruction systems, e.g. as described by the applicant in the international patent applications WO2004/044659, WO2006/119920 or WO2006/119760, are based mainly on the following general principle: Spatial light modulator means modulate a wave front with holographic information. The modulated wave front reconstructs a three-dimensional scene in the form of object light points in a reconstruction volume, which is positioned in front of one or both eyes of one or multiple observers. The reconstruction volume stretches from the exit surface of a display screen, through which the modulated wave front leaves the reconstruction system, to a visibility region in the far field. The Fourier transform which is created when focussing the modulated wave front (or any other far-field transform) of a video hologram which is encoded on the spatial light modulator means lies in the visibility region. However, the holograms can also be encoded such that the object light points do not only appear in front of but also on and behind the display screen, so that the reconstruction volume does not only lie in front of the display screen, but continues beyond that screen and that the observer perceives parts of the reconstructed three-dimensional scene in front of, on or behind the display screen.

The visibility region which is generated by way of focussing has the size of an eye or eye pupil, for example. In this case, a second wave front which is directed at the other eye must deliver a second reconstruction which differs in parallax, so that the other eye is provided another visibility region. If each eye of an observer is situated in a visibility region, the observer can watch the holographically reconstructed scene. The wave fronts which are directed at the different eyes are typically spatially or temporally interleaved with prior art autostereoscopic means. Spatial frequency filters prevent optical cross-talking between the wave fronts. If multiple observers are served, a correspondingly multiplied number of visibility ranges is provided e.g. by way of time- or space-division multiplexing.

In order to maintain a certain clarity, the description below relates mainly to the alignment of a single wave front of the holographic system. The reconstruction system can realise further wave fronts in analogy to the first one, if required. It appears to those skilled in the art that the idea of this invention can be applied as often as necessary for this, depending on the actual number of wave fronts. When doing so, functional elements of the invention can preferably be used commonly for multiple wave fronts.

Alternatively, it is also possible to generate a visibility region which covers both eyes of an observer. However, the size of the visibility region depends on the focal length of the holographic reconstruction system, the wavelength of the used light and the pixel pitch (distance between the centres of two adjacent pixels) of the spatial light modulator which is used for encoding the scene to be holographically reconstructed. The larger the desired visibility region the higher must be the resolution of the SLM used. In order to get a large visibility region, the SLM must have very small pixel apertures which cause great diffraction angles, i.e. the SLM must also have a small pixel pitch and, consequently, a large number of pixels.

In order to reduce the necessary resolution of the SLM, the size of the visibility region can for example be decreased to the size of an eye pupil. However, this may lead to problems with the visibility of the three-dimensional reconstruction, if the observer eye is only partly situated inside the visibility region. Already a slight movement of the observer may cause effects such as disappearance of visibility, vignetting or distortion of the spatial frequency spectrum. Moreover, the borders of the reconstruction volume are difficult to find for an observer whose eyes are situated outside the visibility region. It is therefore necessary for the position of the visibility region to be adapted to the new eye position if an observer moves.

Prior art systems comprise an eye finder for detecting an eye position, and deflection means, for example a mirror, for directing the visibility region at the eye position. The required angular position of the deflection means is found based on the detected eye position, and the deflection means are controlled accordingly in order to match the position of the visibility region to the eye position. When the deflection means have matched the visibility region to the eye position, the hologram for the addressed position is encoded and the three-dimensional scene is reconstructed. Then, the next eye position is detected and so on. This causes the deflection means to move intermittently, which is difficult to be realised using conventional means, in particular at high frequencies, e.g. higher than 20 Hz, as they are easily required when realising a colour multiplexing mode or when simultaneously serving multiple observers.

With a small visibility region, it is further required that the eye finder detects the eye position with a very high accuracy. For example, if the size of the visibility region is between 5 to 10 mm, the eye finder should detect the eye position with a maximum error of about 1 mm. Again, this is difficult to be realised using conventional means.

SUMMARY OF THE INVENTION

It is therefore the object of the present invention to provide a holographic reconstruction system which ensures that one or multiple observers can watch a reconstructed scene correctly even if they move.

The object is solved by a holographic reconstruction system according to this invention with deflection control means for controlling the deflection means such to direct the visibility region sequentially at multiple adjacent viewing positions, and with light control means for switching on the light waves in synchronism with the deflection control means, such that pulsed light is emitted for each viewing position and a sequence of visibility regions is strung together. The invention is further solved by an according method as claimed in claim 17. Preferred embodiments of the invention are described in the dependent claims.

The invention is based on the idea that the visibility region is directed sequentially at multiple adjacent viewing positions within a short period of time, which cannot be distinguished by the human eye, so that the observer is provided a visibility range which is composed of a sequence of visibility regions. This process is repeated at a certain, adequately high frequency which cannot be perceived by the eye, e.g. with at least 50 video holograms per second, so that the visibility region is sufficiently often situated at a viewing position for an observer to get the impression of a steady image.

The visibility region is positioned with the help of deflection means, which are controlled by deflection control means such that they direct the visibility region sequentially to the multiple adjacent viewing positions at a certain frequency. The visibility regions are adjoined in that light control means switch on the light waves in synchronism with the deflection control means. The light control means can for example be means for switching on and off light source means, or means for interrupting the optical path at any point of the system, such as shutters. This way, light pulses are emitted in synchronism with the movement of the deflection means, i.e. a certain number of light pulses per viewing position, e.g. one light pulse for each wavelength provided by the light source means per viewing position in order to generate colour reconstructions. According to a preferred embodiment, the light control means are thus provided to emit multiple light pulses for each viewing position. In another embodiment, the light waves which are capable of generating interference have different wavelengths, and the light control means emit at least one light pulse per wavelength for each viewing position.

The light source means can for example be a laser light source, e.g. a pulsed laser. It is for example also possible to use light-emitting diodes (LEDs) as light source means. It is generally known to a person skilled in the art that each incoherent light source will become sufficiently coherent if it is spatially and/or spectrally filtered.

It generally depends on the eye position within the visibility region how the observer sees the reconstruction of the hologram. If the eye position in the visibility region changes, the perspective from which the observer watches the reconstruction will also change. With a continuously moved visibility region, the observer would remain in his observer position; but he will watch all perspectives while the visibility region covers his eye. In a large visibility region, which is for instance larger than the eye pupil, this could cause a blurred perception of a reconstructed hologram point by the observer because he would see the point from different perspectives quickly one after another. The eye must not perceive this movement in order to prevent the reconstructed points from being blurred. The light pulses must thus be short enough for the observer not to perceive this movement, but also frequent enough for him to get the impression of a steady visibility region.

The perspective from which the hologram for modulating a wave front is visible, is also taken into consideration when computing a hologram for a certain observer position. This perspective is different for each viewing position, i.e. a different hologram had to be encoded for each viewing position, and it thus also differs for the left and right eye if the visibility region is not large enough to serve both eyes simultaneously. It is then necessary for the two eyes to watch differently computed holograms.

It is possible to compute a hologram for each possible viewing position, in order to consider the perspective from which the reconstructed scene would be perceived from those viewing positions. However, it is sufficient to compute a hologram for those viewing positions only where an observer eye was detected, and for the adjacent positions, and not for all possible viewing positions. An eye finder will then be necessary to detect the position of an observer eye. According to a preferred embodiment, the holographic reconstruction system according to this invention thus comprises eye position detection means for detecting the eye position of at least one observer eye, where deflection control means control the deflection means depending on the detected eye position and direct a sequence of visibility regions with video holograms which are encoded accordingly for that eye position at each detected eye position. At least one visibility region should cover the detected eye position. This means for example that a sequence of visibility regions is positioned in a range in front of, on and behind an eye position. It can be provided that the eye position detection means detect each eye, but it is sufficient if the eye position detection means detect only one eye of a pair of eyes. The eye position of the respective other eye can be computed based on the eye separation. It is sufficient to detect an approximate eye position of an eye. If multiple observers are to be served, an according number of pairs of eyes must be detected, or again always one eye of each pair of eyes.

In order to ensure that the observer is able to watch the holographically reconstructed scene homogeneously, even if the eye finder detects the eye position at low accuracy, the hologram can be computed for one viewing position depending on the detected eye position but be maintained over multiple viewing positions, where at least one of the viewing positions covers the detected eye position. It is thus particularly preferred that the same video hologram is encoded on the spatial light modulator means for all viewing positions of a sequence of visibility regions which are assigned to an eye position.

In a preferred embodiment of the solution according to this invention, the deflection means are of a reflective design and are disposed in the optical path such that they reflect the modulated light waves to each viewing position. It is therein particularly preferred that an intermediate image of the video hologram is created on the deflection means. In another embodiment, the holographic reconstruction system according to this invention comprises a telecentric lens for generating the intermediate image of the video hologram, e.g. a demagnified intermediate image. As a Fourier plane (or the plane of a different far-field transformation) is also generated in the telecentric lens, possibly occurring undesired diffraction orders can already be filtered out at that point. In a further embodiment, the holographic reconstruction system according to this invention comprises a projecting lens for magnifying the intermediate image of the video hologram by way of projection onto a focussing display screen. A projecting mirror can be used as an alternative to the projecting lens. A projecting mirror exhibits for example the advantages that chromatic aberrations can be prevented and that the angular range in which the sequence of visibility regions can be positioned can be larger.

In another embodiment, the deflection means exhibit the optical deflection properties of a plane surface. The deflection means can for example have a plane reflecting surface and can e.g. have the form of a plane mirror. The deflection means can for example also have the form of an OASLM or EASLM which only realises the optical imaging properties of a plane surface, but which does not necessarily has a plane surface itself. In alternative embodiments, however, the deflection means can also exhibit the optical imaging properties of a spherical or aspherical surface, or of a combination of a plane, spherical and/or aspherical surface. Thanks to the spherical or aspherical effect, additional optical effects can be achieved. It is for example possible to integrate additional components of the holographic reconstruction system into the deflection means.

In an embodiment, the deflection control means control the deflection means optically, electronically or mechanically. In further embodiments, a combination of at least two of these physical forms is possible. For example, the deflection means are designed in the form of an optically or electronically addressable spatial light modulator. They have the additional advantages that they can work faster than mechanically actuated parts, and that they allow an additional compensation of aberrations.

Individual embodiments provide that the deflection means are an array of electronically addressable optical micro-cells, each of which exhibiting a controllable optical refraction behaviour or a controllable surface inclination, or being encoded with a prism function. Combinations of these features are also possible.

The mechanical control of the deflection means is based on the idea to continuously rotate the deflection means around a rotation axis or continuously pivoting them over an angular range. It thus corresponds to a physical form of the holographic reconstruction system that the deflection control means rotate the deflection means around a rotation axis or pivot them. It is therein preferred that the rotation frequency of the deflection means can be controlled, for example by the deflection control means. As light pulses are provided by the light control means in synchronism with that rotation frequency, multiple visibility regions are adjoined. The light control means preferably create no more than one light pulse per displacement distance which corresponds to the extent of the visibility region in the direction of displacement. One light pulse must be short enough for the observer not to perceive the rotation or pivoting motion of the deflection means as a movement of the watched holographic scene. Thanks to this design, it can be avoided that the observer perceives multiple perspectives while the visibility region passes his eye. This way, a blurred perception of the scene can be prevented.

In an embodiment, the deflection control means are electric motors, e.g. direct-current motors. Generally, any other type of drive which allows the deflection means to be rotated or pivoted and which can provide a sufficiently high and uniform rotary frequency can also be used.

In a further embodiment, the deflection means exhibit a reflecting surface and are connected with the deflection control means such that the rotation axis of the deflection control means lies in the plane of the reflecting surface. The deflection means are preferably designed in the form of front surface mirrors. Thanks to this arrangement, the holographically reconstructed scene does thus not move in relation to the display screen due to the rotation or pivoting motion of the deflection means. If the reflecting surface does not lie on the rotation axis, the mirror will due to its rotation change the optical position of the intermediate image which is projected onto the deflection means in relation to the projecting lens. This embodiment is explained in detail in the description of FIG. 6.

BRIEF DESCRIPTION OF THE DRAWINGS

The present invention is described in more detail below with reference to the drawings, wherein.

DETAILED DESCRIPTION

Figure 1:
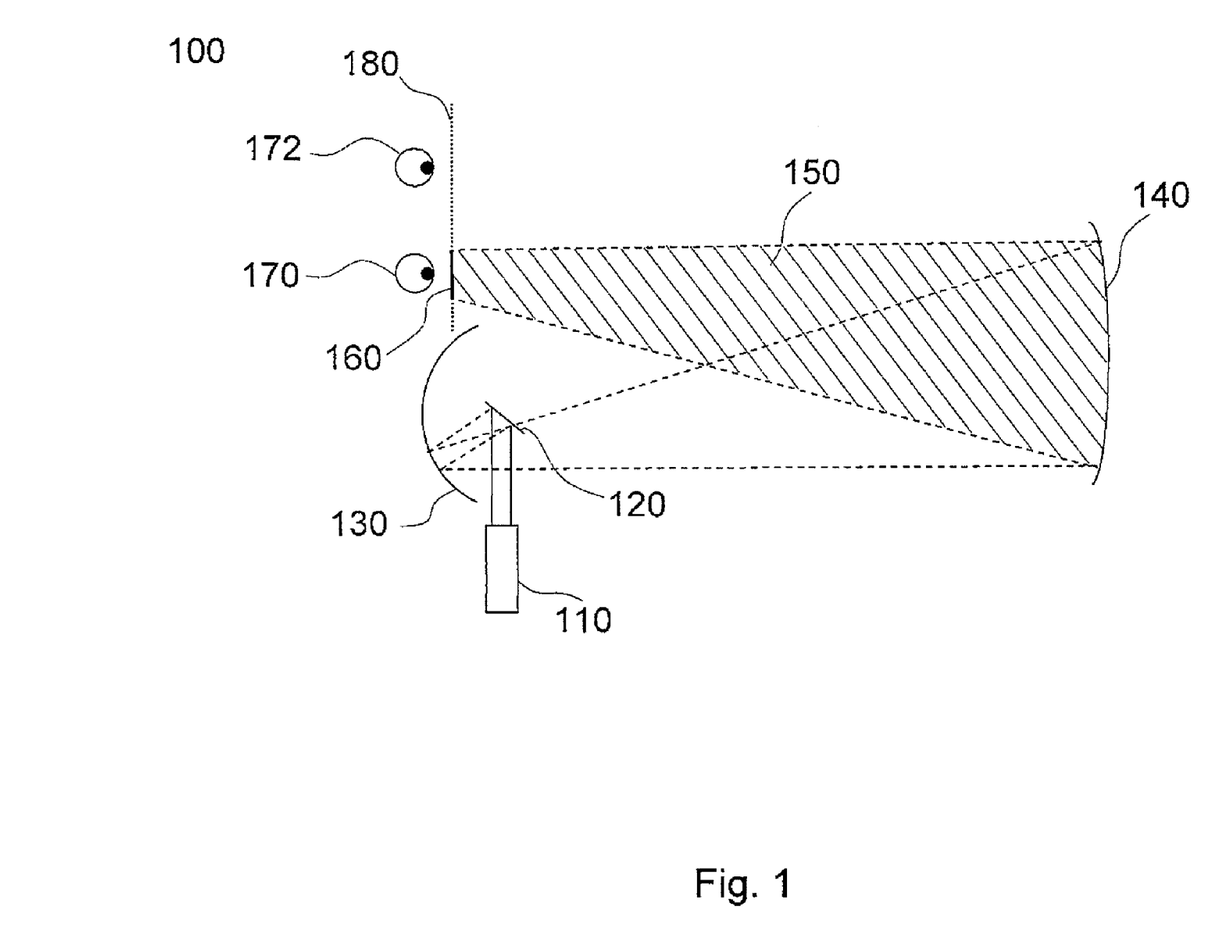
FIG. 1 is a top view providing a simplified illustration of the principle of the present invention, which shows the visibility region at a first point of time.

FIG. 1 is a top view which shows in a simplified diagram the principle of the present invention. The position of the visibility region at a first viewing position at a first point of time is shown.

The shown holographic reconstruction system 100 comprises a hologram projector 110, deflection means 120, projection means 130, and a display screen 140. The drawing further shows a reconstruction volume 150 which stretches between display screen 140 and a visibility region 160, a first eye position 170, a second eye position 172, and a possible visibility range 180 in which the visibility regions can be strung together. The reconstruction volume 150 is here shown in an exemplary and simplified manner; it can stretch in front of, on and behind the display screen 140.

The hologram projector 110 projects an intermediate image of a hologram, which is encoded on a spatial light modulator (SLM) (not shown in this drawing), onto the deflection means.

The deflection means 120, for example a plane mirror, an optically addressable spatial light modulator (OASLM), or an electronically addressable spatial light modulator (EASLM), change the direction of the intermediate image of the SLM, which is projected onto them by the hologram projector 110, towards the projection means 130. It is also possible that the deflection means 120 additionally have a spherical or aspherical effect, such as that of a spherical or aspherical mirror. This allows several optical functions to be combined in one element.

The deflection means 120 are controlled by deflection control means (not shown in this Figure). For example, the deflection control means control the deflection means mechanically, as shown in the first embodiment described below and in FIG. 6. In the second and third embodiment, which will also be described below, the deflection means is for example controlled optically or electronically.

The projection means 130 are designed in the form of aspherical, in particular elliptic projecting mirrors in this embodiment. However, the projection means can also be designed in the form of spherical, plane or adaptive projecting mirrors. Using a projecting mirror is preferred to a projecting lens because the angular range in which the sequence of visibility regions can be positioned is larger when a projection mirror is used. The projection means 130 reflect the light which is incident on them towards the display screen 140.

The display screen 140 in this embodiment is a spherical mirror and it reflects and focuses the incident light into a certain direction, depending on its shape and the angle of incidence. The visibility region 160 is thus generated from which the observer can watch the holographically reconstructed scene in the reconstruction volume 150 when at least one eye is situated within this visibility region. This means that an eye which is situated at the eye position 170 can watch the holographically reconstructed scene in the reconstruction volume 150. However, the display screen 140 can also be designed in the form of an aspherical, plane or adaptive mirror.

Both the first eye position 170 and the second eye position 172 can refer to the same eye, which has moved from the first to the second eye position, or to different eyes, e.g. the observer's left and right eye, or the left eye of one observer and the right eye of another observer. An eye which is situated at the second eye position 172 at the first point of time shown in this drawing, would not see any reconstruction of the three-dimensional scene at that point of time. However, the string-up of the visibility regions and their repetition takes place at such a high speed that an observer does not perceive the time difference between the repeated appearance of the visibility region in front of his eye.

Figure 2:
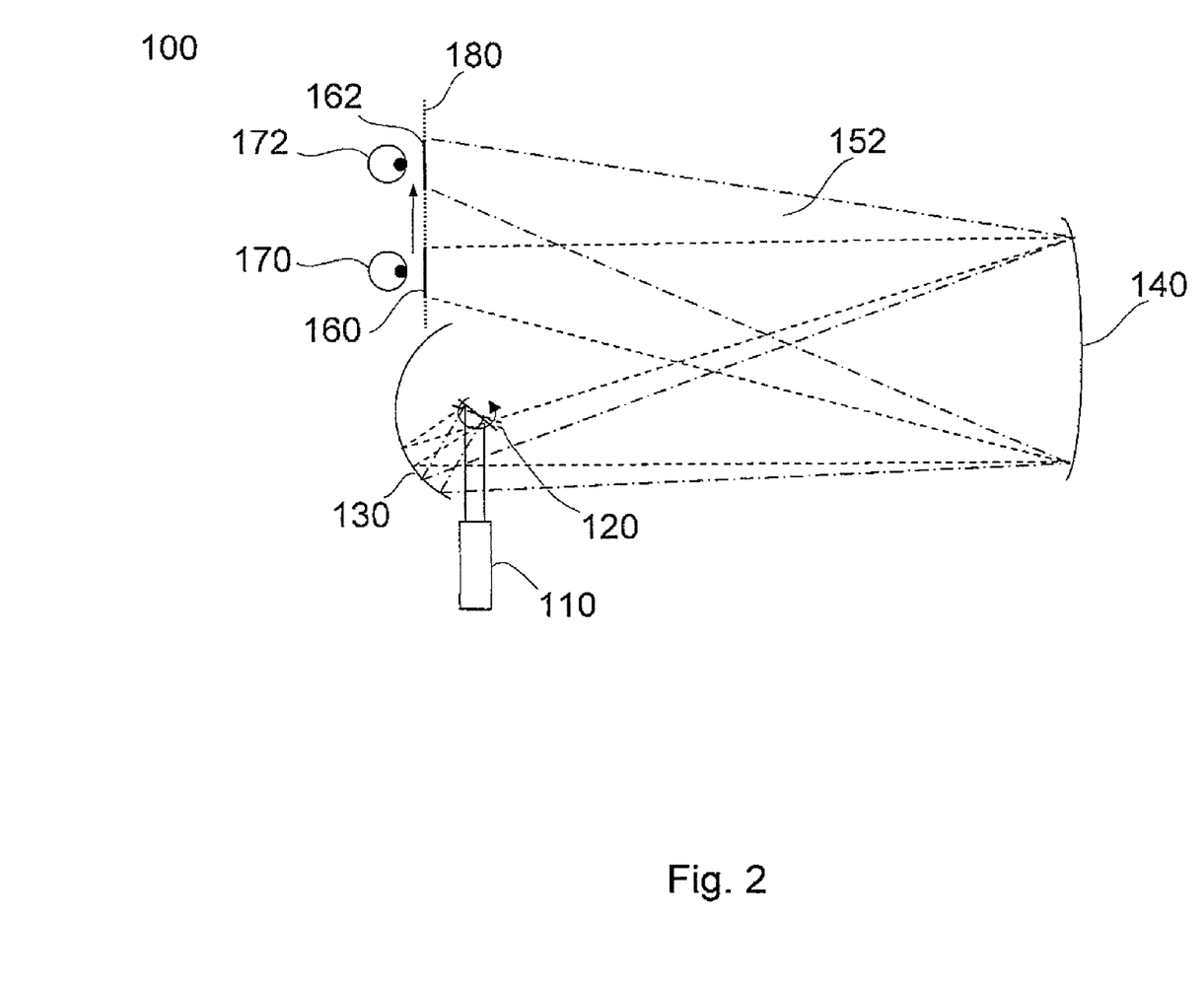
FIG. 2 is a top view providing a simplified illustration of the principle of the present invention, which shows the visibility region at a first point of time and at a second point of time.

FIG. 2 is a top view which shows in a simplified diagram the principle of the present invention. The visibility region is shown at a first viewing position at a first point of time, as in FIG. 1, and, additionally, at a second viewing position at a second point of time. The arrangement is the same as shown in FIG. 1; identical reference numerals denote identical elements. Further, FIG. 2 shows a second viewing position 162 and a second position of the reconstruction volume 152.

A continuous rotation or pivoting, or a repeated sequential change of the optical deflection function of the deflection means 120 initiated by the deflection control means causes the visibility region 160 to be sequentially displaced within the visibility range 180. At the second point of time the visibility region is situated at the second viewing position 162. An eye which is situated at the second eye position 172 at the second point of time can watch the holographically reconstructed scene in the reconstruction volume 152 at that point of time.

Figure 3:
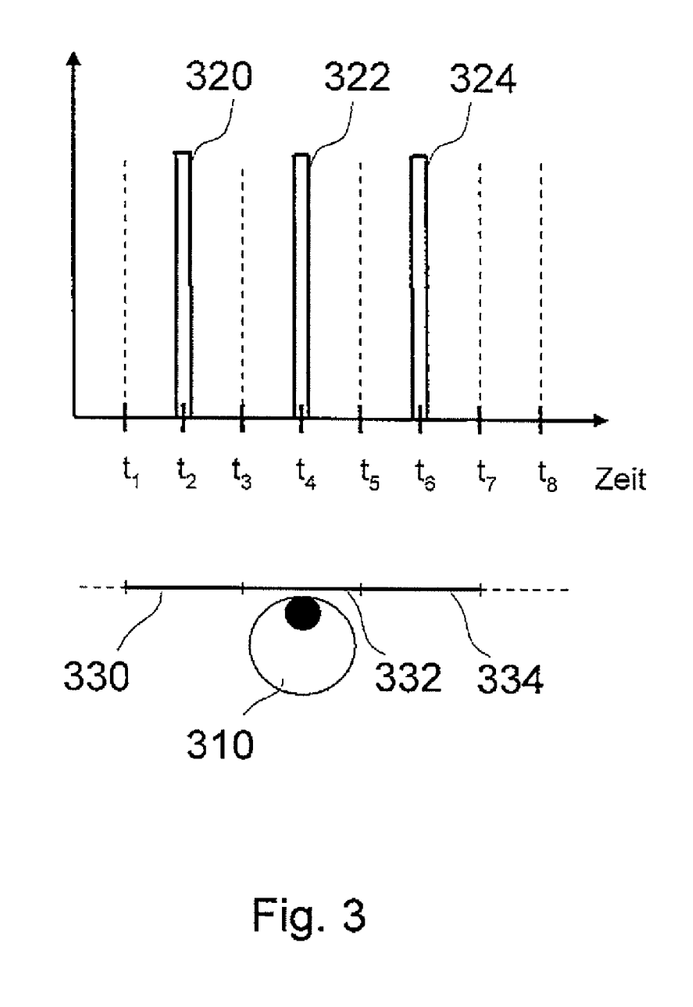
FIG. 3 is a schematic view which illustrates the generation of the visibility region by light pulses.

FIG. 3 is an exemplary, schematic view which illustrates the generation of the visibility region with the help of light pulses. This drawing shows an eye position 310, light pulses 320, 322, 324 and visibility regions at viewing positions 330, 332, 334 at points of time t1 to t8.

Between the points of time t3 and t5 the visibility region 332 covers the eye position 310. This means that the observer can watch a reconstruction during that period of time. Now, if a light pulse is generated whose duration is equal or less than t5−t3, the observer can only watch a small perspective section of the reconstruction, irrespective of where exactly he is situated within the visibility region.

The light control means provide light pulses 320, 322, 324 at a certain frequency. The provision of the light pulses by the light control means and the positioning of the visibility region by the deflection control means are matched such that the visibility regions at the viewing positions 330, 332, 334 do not overlap. This can also be seen in the figure. Light pulses are only provided at the points of time t2, t4 and t6. Due to the control of the deflection means by the deflection control means and the corresponding movement of the visibility region, the visibility regions at the viewing positions 330, 332, 334 do not overlap at those points of time. The second viewing position 332 is displaced in relation to the first viewing position 330 by the size of the visibility region. Again, the third viewing position 334 is displaced in relation to the second viewing position 332 by the size of the visibility region.

If a light pulse was provided at all points of time t1 to t6, the visibility regions would overlap and the observer could perceive a blurred image.

In addition, an eye position detection means is provided to detect the eye position of at least one eye 310. The light source means can then provide light pulses 320, 322, 324 depending on the eye position 310. In doing so, possible inaccuracies in the detection of the eye position 310 can be taken into account. As shown in the drawing, the first viewing position 330 before the detected eye position is generated by the first light pulse 320. Then, according to this drawing, two further light pulses 322, 324 follow, which generate the viewing positions 332, 334, which follow the first viewing position 330. It is thus ensured that even if the eye position is detected somewhat inaccurate the eye at the eye position 310 will be reliably provided with a visibility region.

In order to prevent an observer from perceiving multiple perspectives, and consequently from seeing the object blurred, an identical object reconstruction can additionally be provided to the subsequent viewing positions by those subsequent light pulses.

The number of light pulses and viewing positions is of course not limited as shown in this drawing.

Figure 4:
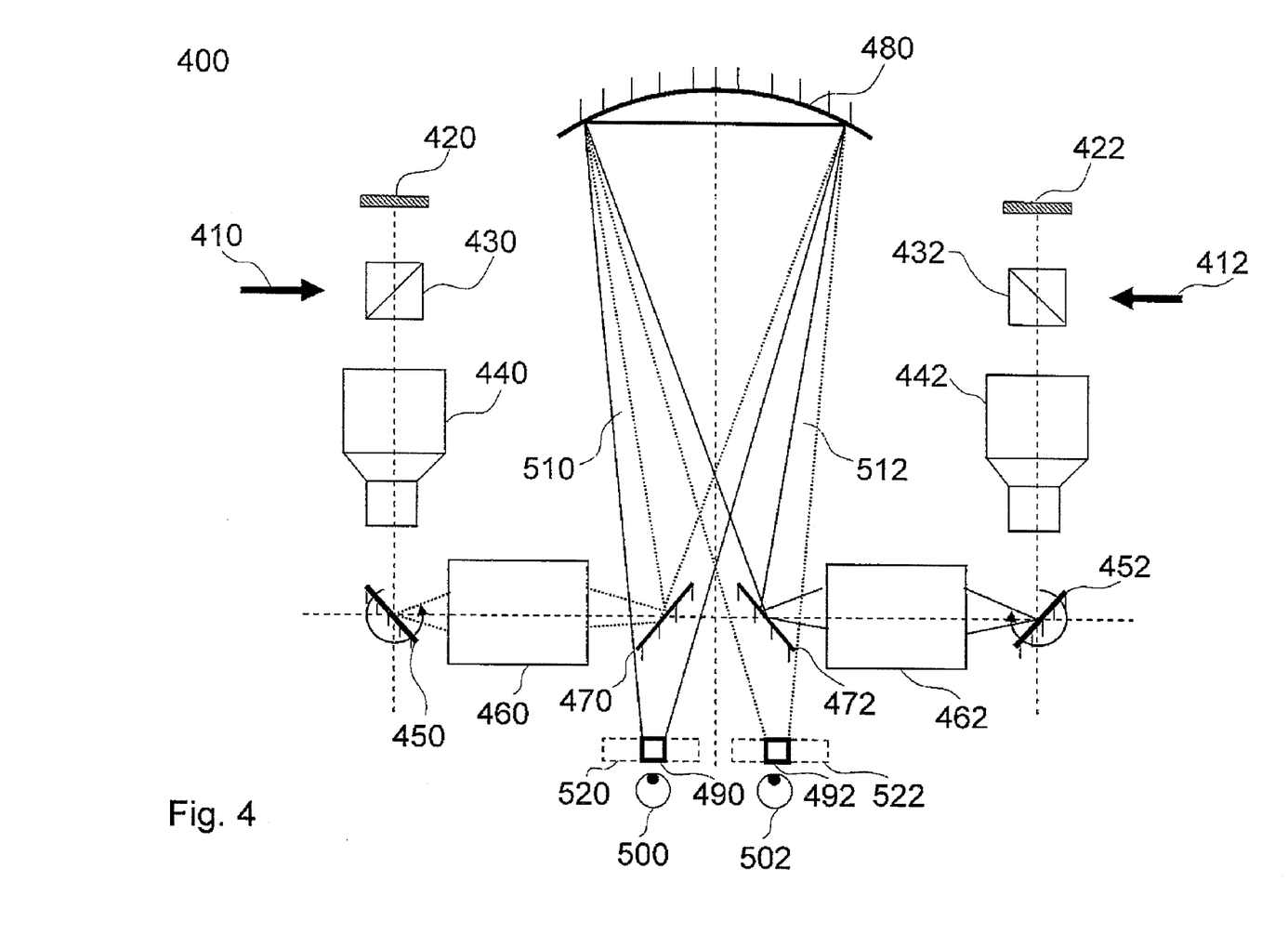
FIG. 4 is a simplified view of an inventive holographic reconstruction system according to a first embodiment at a first point of time.

FIG. 4 is a simplified view of an inventive holographic reconstruction system 400 according to a first embodiment at a first point of time. The drawing shows light source means 410, 412, spatial light modulator means (SLM) 420, 422, a beam splitter 430, 432, a telecentric lens 440, 442, deflection means 450, 452, a projection lens 460, 462 and reflection means 470, 472. A display screen 480 is only provided once in the entire arrangement. Further, a visibility region 490, 492, and eye position 500, 502, a reconstruction volume 510, 512 and a visibility range 520, 522 are shown. Deflection control means for controlling the deflection means and light control means for generating light pulses are not explicitly shown in this drawing.

As can be seen in the drawing, the entire arrangement comprises two assemblies of analogous design. Each assembly generates the image for one eye. The following description relates to only one of those assemblies. A person skilled in the art can easily translate the principle to the other assembly. Generally, solutions with one assembly are possible as well, e.g. using time-division multiplexing methods.

The light source means 410 have the form of a pulsed laser in this embodiment. The pulsed laser is temporally modulated by the light control means, for example by way of electric control or mechanically, e.g. using a shutter. The light source means 410 can comprise a beam expander which expands the beam diameter of the laser. According to another embodiment, it is also possible to provide multiple lasers with different wavelengths. According to a still further embodiment, it is further possible to employ different light source means instead of a laser and to filter the coherent portion of the light.

The light source means 410 illuminate the telecentric lens 440 through the beam splitter 430, which has the property of reflecting light which is linear polarised in a certain direction. The SLM 420 is thus illuminated with as much light energy as possible. A diffraction pattern is provided on the SLM 420, which has a pixel grid, by way of amplitude modulation. After being reflected from the SLM 420, the diffracted laser light propagates towards the telecentric lens 440.

A shutter which causes the laser light to be spatially filtered is disposed in a focal plane or Fourier plane of an entry lens of the telecentric lens 440. Undesired orders of the diffraction are removed there. The light energy of the undesired order(s) can be much higher than the portion of the desired order. The telecentric lens 440 projects a demagnified intermediate image, e.g. at a scale of 1:2, of the SLM 420 onto the deflection means 450. There is a demagnified, real intermediate image of the SLM 420.

In this embodiment, beam splitter 430, SLM 420 and telecentric lens 440 are disposed before the deflection means 450 in the optical path.

Figure 6:
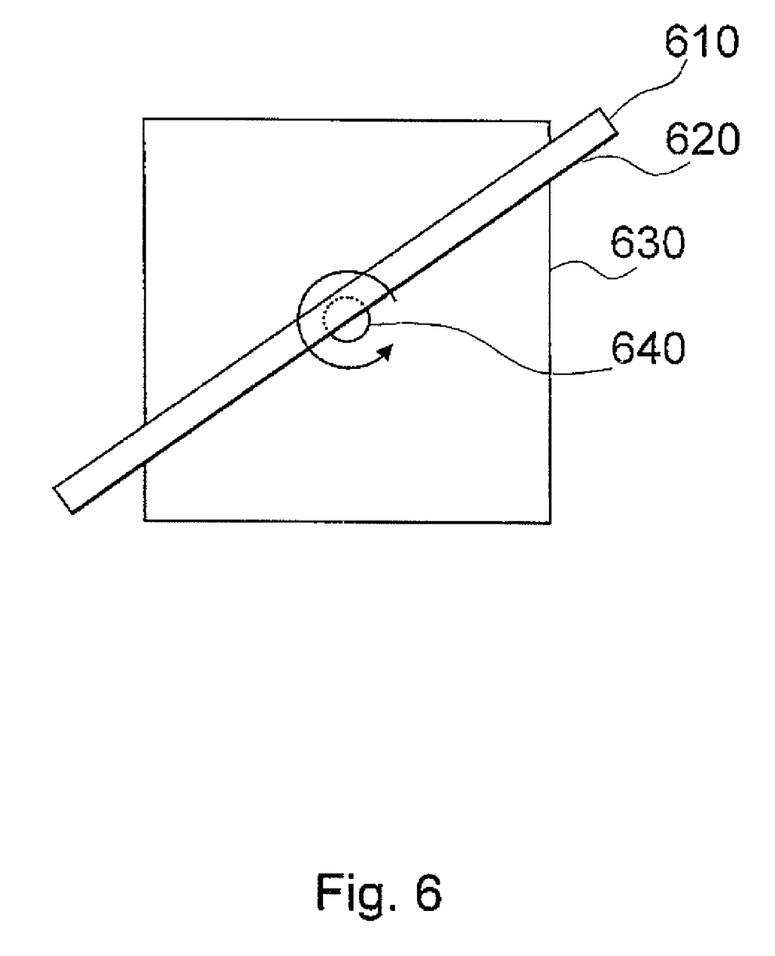
FIG. 6 is a simplified top view showing the mutual arrangement of deflection means and deflection control means according to the first embodiment.

In this first embodiment, the deflection means 450 have the form of a plane mirror, which is pivoted by deflection control means (not shown in this drawing), e.g. a DC motor. The rotation axis of the deflection control means lies in the plane of the mirror surface. This is shown in FIG. 6. The light emitted by the telecentric lens 440 is deflected by the deflection means towards the projection lens 460.

In this embodiment, projecting lens 460, reflection means 470 and display screen 480 are disposed after the deflection means 450 in the optical path.

The projecting lens 460 projects the demagnified intermediate image of the SLM 420 which is deflected by the deflection means 450 onto the reflection means 470. In this embodiment, the reflection means 470 is a plane mirror, which reflects the incident light towards the display screen 480. The display screen 480 has the form of a spherical mirror in this embodiment. The display screen 480 is arranged such that it effects a 1:1 projection of the Fourier plane of the SLM 420 into the visibility region 490. The reconstruction volume 510 stretches between the display screen 480 and the visibility region 490 here. An eye of an observer which is situated at the eye position 500 sees the reconstructed scene in the reconstruction volume 510 from the visibility region 490.

In this first embodiment, a rotation of the deflection means 450 changes the optical path such that the visibility region 490 is displaced within the visibility range 520. The extent of the visibility range 520 is spatially limited caused by the design of the holographic reconstruction system 400. When the deflection means 450 has completed a full revolution, then the visibility region 490 will appear at the beginning of the visibility range 520 again. The direction of displacement of the visibility region 490 depends on the direction of rotation of the deflection means 450. However, the direction of rotation is irrelevant for the general principle of the present invention.

Generally, the SLM 420 can be encoded with different holograms for each viewing position within the visibility range 520. If the visibility range 520 is rather small, it is however also possible to provide only one hologram code to the SLM for all viewing positions within that visibility range 520. Alternatively, an intermediate solution is also possible where the SLM 420 is encoded with one hologram for each section of the visibility range 520, said sections comprising at least two viewing positions.

Figure 5:
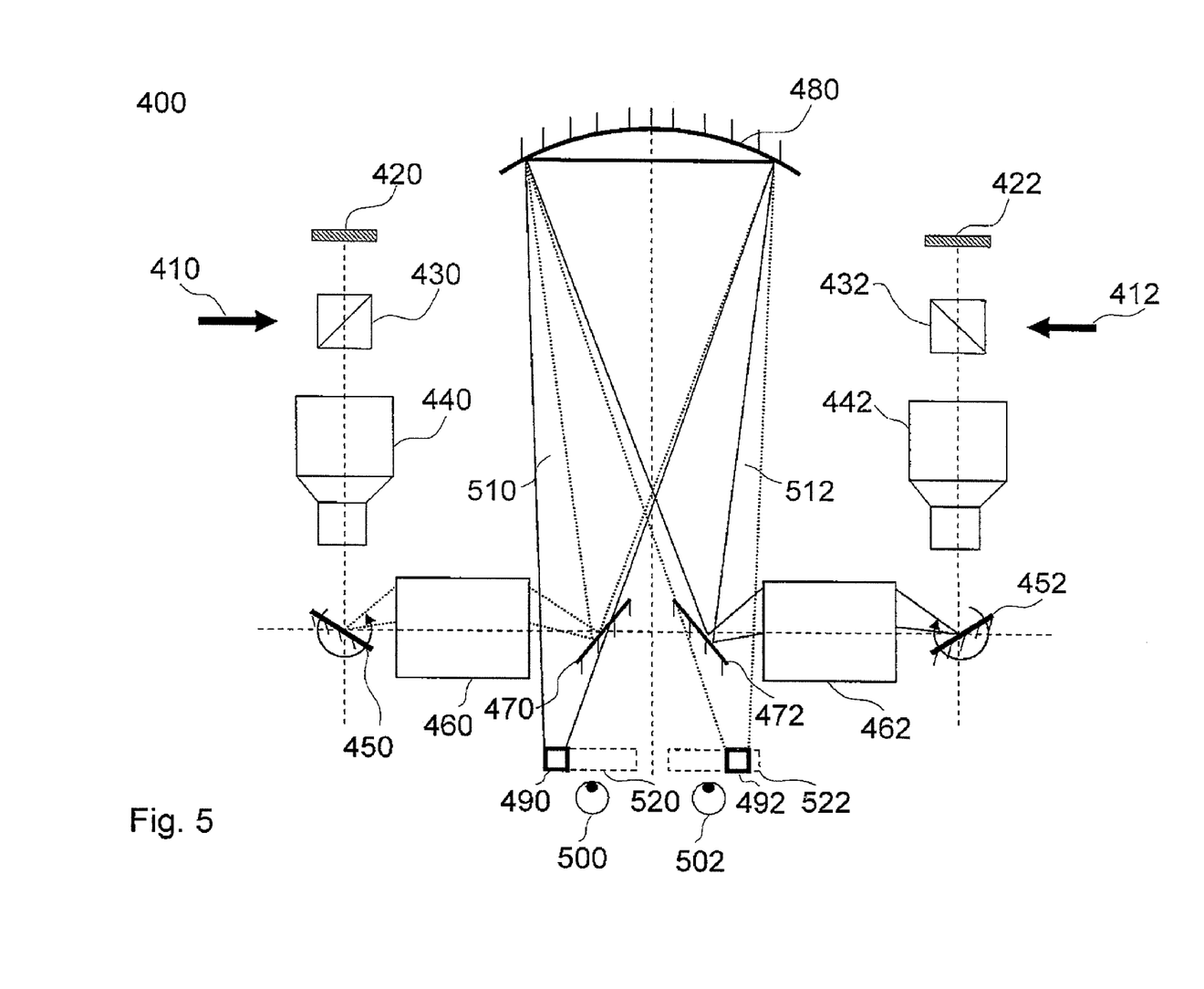
FIG. 5 is a simplified view of an inventive holographic reconstruction system according to the first embodiment at a second point of time.

FIG. 5 is a simplified view of an inventive holographic reconstruction system according to the first embodiment at a second point of time. The arrangement is the same as shown in FIG. 4. In this drawing, however, the deflection means 450 have a different angular position compared with the situation shown in FIG. 4. The thus changed optical path also causes the visibility region 490 to have a different viewing position within the visibility range 520.

At that second point of time the observer does not see any reconstruction of the holographic scene from the eye position 490. However, the rotation frequency of the deflection means 450 is high enough for the observer not to notice this. The visibility region 490 appears in front of his eye often enough for the holographically reconstructed scene to be perceived as a steady scene.

FIG. 6 is a simplified top view showing the mutual arrangement of deflection means and deflection control means according to the first embodiment. The deflection means are pivoted, where the rotation axis lies in the plane of the mirror surface. It shows deflection means 610 with a reflective surface 620 and deflection control means 630 with a shaft 640.

The shaft 640 is mounted to the deflection control means 630, e.g. to a DC motor. The deflection control means 630 rotate the shaft 640 around a rotation axis. The rotation axis lies in the centre of the shaft 640. The rotary movement is exemplarily indicated by an arrow in the drawing—however, the shaft can also rotate in the other direction. As can be seen in the Figure, the deflection means 610 is mounted to the shaft 640 such that the reflective surface 620 is disposed on the rotation axis, which lies in the centre of the shaft 640. If the shaft 640 rotates, then the reflective surface 620 will thus not move out of the centre of the shaft 640, so that no undesired effects occur such as undesired changes to the optical path.

The deflection control means 630 have a rotational speed which is high enough for an observer not to perceive the movement of the visibility region as flickering. Further, the deflection control means have a constant rotational speed, i.e. the rotational speed does not have any undesired fluctuations.

As an alternative to mechanically controllable deflection means, as described in the first embodiment, non-mechanically controlled deflection means can be used, such as optically or electronically controllable deflection means. Combinations of these physical forms are also possible. The design of the corresponding holographic reconstruction system can be the same as shown in FIGS. 4 and 5, i.e. the deflection means are disposed in the optical path as shown in FIGS. 4 and 5, but the deflection means and deflection control means are of different design. Possible arrangements with optically controllable deflection means will be described below with the example of a second and third embodiment with reference to FIGS. 7 and 8.

Figure 7:
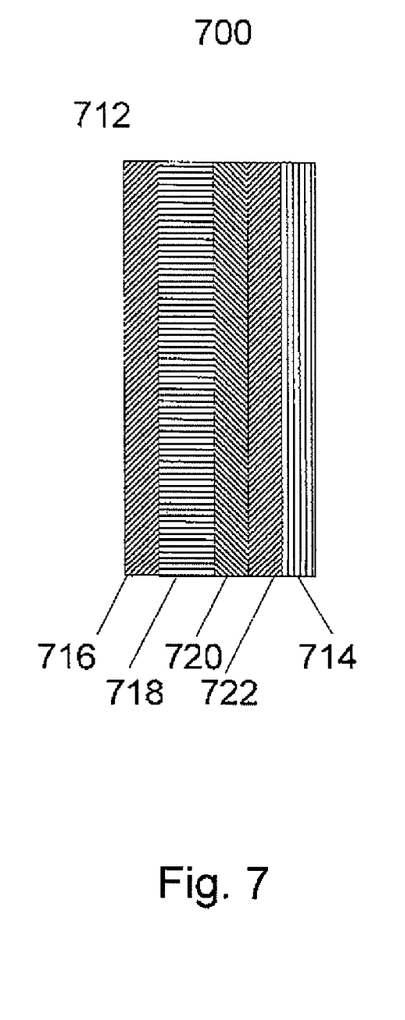
FIG. 7 shows the general design of deflection means according to a second embodiment.

FIG. 7 shows the general design of deflection means 700 according to a second embodiment of this invention with an optically addressable spatial light modulator (OASLM) 712 with a diffractive structure and a deflection mirror 714, which is attached to the OASLM 712.

According to this embodiment, the OASLM 712 comprises a first glass plate 716 with a transparent electrode, an LC layer 718, which forms the diffractive structure of the OASLM 712 and which contains LC molecules, a transparent, photosensitive semiconductor layer 720, and a second glass plate 722 as the substrate. In this embodiment, the OASLM 712 is transparent for the light which is used for the reconstruction of the three-dimensional scene, so that this light can reach the deflection mirror 714 which is arranged behind.

Figure 8:
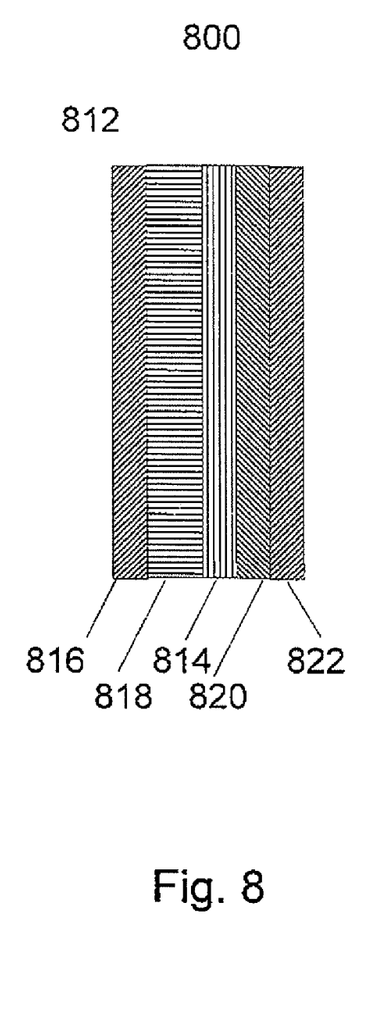
FIG. 8 shows the general design of deflection means according to a third embodiment.

FIG. 8 shows the general design of deflection means 800 according to a third embodiment of this invention with an optically addressable spatial light modulator (OASLM) 812 with a diffractive structure, where a deflection mirror 814 in the form of a reflecting layer is integrated into the OASLM 812.

In this embodiment, the OASLM 812 again comprises a glass plate 816 with a transparent electrode, an LC layer 818, which forms the diffractive structure of the OASLM 13 and which contains LC molecules, a photosensitive semiconductor layer 820, and a glass plate 822 as the substrate. The deflection mirror 814 is integrated between the LC layer 818 and the semiconductor layer 820 in this embodiment.

Alternatively, it is possible that the OASLM 712, 812 exhibits a refractive structure or a combination of a diffractive and a refractive structure, so that also a refractive light modulation is possible on the OASLM with a refractive index variation.

It is further possible that the deflection mirror 714, 814 is integrated into the OASLM 712, 812 at a different position. As in all other embodiments, it must be noted though that the light which is used for the reconstruction of the three-dimensional scene must not be absorbed in the semiconductor layer. Further, the semiconductor layer must only be affected by the writing light of the deflection control means, i.e. the light which is used to control the deflection properties of the deflection means, and it must be ensured that the writing light is not perceived by the observer in the visibility region. In order to achieve this, the deflection mirror can for example be transparent in several respects, e.g. only in partial areas, only in one direction, only for selected wavelengths, only for certain polarisations or combinations thereof.

The optical deflection properties of the deflection means 700, 800 are controlled by deflection control means. In the second and third embodiment, these can for example be integrated into the light source means and provide writing light for controlling the deflection means which has a different wavelength than the light which is used for the reconstruction of the three-dimensional scene. The writing light can for example be provided in the form of a scanning laser beam, which is focused on the semiconductor layer 720, 820 of the OASLM 712, 812 and which scans the latter. The intensity of the laser beam is modulated in synchronism with its movement, so that the semiconductor layer 720, 820 is exposed to the required intensity distribution. This method can only be applied if a bi-stable OASLM is used, so that the diffractive structure exists as a whole. The writing light provided by the deflection control means is light in a wavelength range that is invisible to the human eye, so that the writing light is not perceived by the observer in the visibility region. As an alternative to using a single scanning laser beam, multiple scanning laser beams can be used, each of which only inscribing a subsection of the OASLM. If only one scanning laser beam is used for writing, it must satisfy great demands, because it must have both a very small focal point and a large scanning range.

The optical deflection properties of the deflection means are modified by the deflection control means as follows: An electric field is generated between the photosensitive semiconductor layer 720, 820 and the first glass plate 716, 816 with the transparent electrode. If a spot on the photosensitive semiconductor layer 720, 820 is illuminated with writing light provided by the deflection control means, the electric field will be affected locally. This, in turn, changes the orientation of the LC molecules in the LC layer 718, 818 and thus also the local refractive index. The variation in the refractive index of the OASLM 712, 812 can effect a phase or amplitude modulation. A phase modulation is preferred because of the higher diffraction efficiency.

Generally, the refractive index variation can be mono-stable or bi-stable. In the case of mono-stability, the refractive index variation is only present as long as the semiconductor layer is being illuminated. In the case of bi-stability, the refractive index variation will continue after the layer is ceased to be illuminated, until a voltage supplied to the OASLM will reset the device to its initial condition.

Light which hits the deflection mirror 714, 814 is reflected from it, and its optical path is affected by the OASLM 712, 812. The deflection control means control the optical deflection function of the deflection means 700, 800 such that the angle at which light which hits the deflection means 700, 800 is reflected from it sequentially such that the visibility region is displaced. The sequence is repeated at a speed which is so high that an observer cannot perceive it. Further, light pulses are provided in synchronism with the control of the optical deflection function of the deflection means 700, 800. This way, visibility regions are strung together, as in the first embodiment. The modification of the optical deflection function of the deflection means 700, 800 is caused by changing the orientation of the LC molecules in the LC layer as describe above. Generally, the deflection angle of the light depends on the orientation of the LC molecules or the refractive index of the LC layer.

The modification of the optical deflection function of the deflection means 700, 800 takes place at such a high speed and repetition rate that an observer does not perceive the movement of the visibility region. Further, the deflection control means control the deflection means 700, 800 at a very constant rate, i.e. the sequence and repetition rate do not have any undesired fluctuations.

Alternatively, the deflection control means can also have the following forms in the second and third embodiments: The semiconductor layer can be inscribed from a direction which is opposite the direction of the light used for the reconstruction, i.e. the deflection control means is disposed behind the deflection mirror. According to the specific embodiment, the light which is used for the reconstruction and the writing light should exhibit the necessary properties, e.g. differ in polarity or wavelength, and the layers of the OASLM should have corresponding properties. It is further possible that by selecting a certain angle of incidence of the writing light it is avoided that writing light is perceived by the observer in the visibility region.

Further, the OASLM can be controlled by exposure to an interference pattern which is generated by interference of two coherent light sources, which may for example be linked using optical fibre cables or a beam splitter. This interference pattern on the semiconductor layer causes the refractive index variation in the OASLM. This method works very much like the holographic exposure of a light-sensitive film. During the subsequent scanning with a light source in the entry-side focal point, the hologram which is exposed in the OASLM reconstructs the light source in the exit-side focal point.

In order to sequentially generate one visibility region respectively for the eyes of one or multiple observers, it is possible that the required diffractive structure is sequentially written to the OASLM. In order to display a coloured holographic reconstruction, partial reconstructions which represent the individual primary colours are generated sequentially, and the diffractive structures which correspond with the specific wavelengths are sequentially written to the OASLM.

In a fourth embodiment, the deflection means is an electronically addressable spatial light modulator (EASLM), and the deflection control means is designed to control the deflection means electronically. The applicant has disclosed such light modulators for example in the hitherto unpublished applications DE 10 2007 051 521.0 and U.S. Ser. No. 12/100,032. The light modulators described in these applications are preferably operated in the reflective mode. Such light modulators can be controlled through a standard data bus.

A holographic reconstruction system with a visibility region which is sequentially directed at multiple adjacent viewing positions, and an according method, have been described above with reference to the accompanying drawings and embodiments. However, the invention is not limited to the embodiments described above.

If elements of the holographic reconstruction system are arranged in a different way, elements can be omitted, integrated or combined with each other. Moreover, features of the individual embodiments can be combined with each other.

It is further also possible to generate a visibility region in which the observer can watch a holographically reconstructed scene with both eyes. The principle of the present invention can then be applied as well.

The invention claimed is:

1. Holographic reconstruction system for a three-dimensional reconstruction of object light points of a scene, comprising
   Spatial light modulator means for the modulation of light waves which are capable of generating interference with at least one video hologram,
   Focusing means for focusing the modulated light waves such that an observer can watch the reconstructed object light points of the scene from a thus generated visibility region, and
   Deflection means for positioning the visibility region by way of directing the modulated light waves accordingly, and
   Deflection control means for controlling the deflection means so as to direct the visibility region sequentially at multiple adjacent viewing positions, wherein
   Light control means for switching on the light waves in synchronism with the deflection control means such that pulsed light is emitted for each viewing position and a sequence of visibility regions is strung together.

2. Holographic reconstruction system according to claim 1, wherein multiple light pulses can be emitted by the light control means for each viewing position.

3. Holographic reconstruction system according to claim 1, wherein the light waves which are capable of generating interference have different wavelengths, and where at least one light pulse can be emitted by the light control means per wavelength for each viewing position.

4. Holographic reconstruction system according to claim 1 with eye position detection means for detecting the eye position of at least one observer eye, wherein the control of the deflection means is effected by the deflection control means depending on the detected eye position and where a sequence of visibility regions with video holograms which are encoded accordingly for that eye position are directed at each detected eye position.

5. Holographic reconstruction system according to claim 4, wherein the spatial light modulator means are encoded with the same video hologram for all viewing positions of a sequence of visibility regions which are assigned to an eye position.

6. Holographic reconstruction system according to claim 1, wherein the deflection means are of a reflective type and are disposed in an optical path such that the deflection means reflect the modulated light waves to each viewing position.

7. Holographic reconstruction system according to claim 6, wherein an intermediate image of the video hologram is created on the deflection means.

8. Holographic reconstruction system according to claim 7 with a telecentric lens for creating the intermediate image of the video hologram.

9. Holographic reconstruction system according to claim 7 with a projecting lens for magnifying the intermediate image of the video hologram by way of projection onto a focusing display screen.

10. Holographic reconstruction system according to claim 1, wherein the deflection means exhibit the optical deflection properties of a plane surface.

11. Holographic reconstruction system according to claim 1, wherein the deflection means can be controlled optically, electronically or mechanically, or with a combination of at least two of these control options, by the deflection control means.

12. Holographic reconstruction system according to claim 1, wherein the deflection means are designed in the form of an optically or electronically addressable spatial light modulator.

13. Holographic reconstruction system according to claim 1, wherein the deflection means are an array of electronically addressable optical micro-cells, each of which exhibiting a controllable optical refraction behaviour or a controllable surface inclination, or being encoded with a prism function, or exhibiting a combination of at least two of said features.

14. Holographic reconstruction system according to claim 1, wherein the deflection means can be rotated around a rotation axis or pivoted by the deflection control means.

15. Holographic reconstruction system according to claim 14, wherein the deflection control means are designed in the form of an electric motor.

16. Holographic reconstruction system according to claim 14, wherein the deflection means have a reflecting surface and where the deflection means and the deflection control means are connected such that the rotation axis of the deflection control means lies in the plane of the reflective surface.

17. Holographic reconstruction method for a three-dimensional reconstruction of a scene in a holographic reconstruction system, comprising
   Modulation of light waves which are capable of generating interference with at least one video hologram,
   Focusing of the modulated light waves such that an observer can watch the reconstructed scene from a visibility region thus generated by this focusing, and Positioning the visibility region by way of accordingly directing the focused, modulated light waves with a deflection means being controlled by a deflection control means, and Sequential directing of the visibility region at multiple adjacent viewing positions by way of switching on the light waves to the viewing positions in synchronism with the deflection control means, such that pulsed light is emitted for each viewing position and a sequence of visibility regions is strung together.

18. Holographic reconstruction method according to claim 17, comprising

Detection of an eye position of observer eyes, and

Directing a sequence of visibility regions with video holograms which are encoded accordingly for that eye position at each detected eye position.

19. Holographic reconstruction method according to claim 18, wherein the same video hologram is encoded for all viewing positions of a sequence of visibility regions which are assigned to an eye position.

* * * * *